US011056826B2

(12) United States Patent
Takeuchi et al.

(10) Patent No.: US 11,056,826 B2
(45) Date of Patent: Jul. 6, 2021

(54) WIRE HOLDING MEMBER

(71) Applicants: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

(72) Inventors: Shunya Takeuchi, Mie (JP); Teruo Hara, Mie (JP); Hisashi Kojima, Mie (JP)

(73) Assignees: AUTONETWORKS TECHNOLOGIES, LTD., Mie (JP); SUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/757,646

(22) PCT Filed: Oct. 18, 2018

(86) PCT No.: PCT/JP2018/038793
§ 371 (c)(1),
(2) Date: Apr. 20, 2020

(87) PCT Pub. No.: WO2019/082784
PCT Pub. Date: May 2, 2019

(65) Prior Publication Data

US 2020/0328556 A1 Oct. 15, 2020

(30) Foreign Application Priority Data

Oct. 24, 2017 (JP) ............................ JP2017-205199

(51) Int. Cl.
*H01R 13/58* (2006.01)
*H01R 13/432* (2006.01)
*H01R 13/502* (2006.01)

(52) U.S. Cl.
CPC ....... *H01R 13/5816* (2013.01); *H01R 13/432* (2013.01); *H01R 13/502* (2013.01)

(58) Field of Classification Search
CPC ............ H01R 13/5812; H01R 13/5816; H01R 13/585; H01R 13/6583; H01R 13/18; H01R 4/184; H02G 15/007; H02G 15/16
See application file for complete search history.

(56) References Cited

U.S. PATENT DOCUMENTS 9,252,578 B2 * 2/2016 Korcz .................. H02G 3/0691

FOREIGN PATENT DOCUMENTS

| | | |
|---|---|---|
| JP | 40-035408 | 12/1965 |
| JP | 52-057297 | 4/1977 |
| JP | 61-163576 | 7/1986 |

OTHER PUBLICATIONS

Official Communication issued in International Bureau of WIPO Patent Application No. PCT/JP2018/038793, dated Dec. 18, 2018.

* cited by examiner

*Primary Examiner* — Vanessa Girardi
(74) *Attorney, Agent, or Firm* — Greenblum & Bernstein, P.L.C.

(57) ABSTRACT

A wire holding member is a wire holding member for holding a wire in which an outer circumference of a core wire is covered by an insulating covering, the wire holding member including: a front wall that includes an insertion hole having an inner diameter larger than an outer diameter of the core wire so as to allow the core wire to be passed therethrough; an upper extending piece and a lower extending piece that extend rearward from a plurality of different (Continued)

end edges of the front wall, and that are to be disposed around the insulating covering; and an upper holding portion and a lower holding portion that protrude from rear end portions of the upper extending piece and the lower extending piece toward the insulating covering, and that clamp an outer surface of the insulating covering, wherein at least the upper and lower extending pieces and the upper and lower holding portions are made of a metal.

2 Claims, 9 Drawing Sheets

WIRE HOLDING MEMBER

TECHNICAL FIELD

A technique disclosed in the present specification relates to a wire holding member for holding an insulating covering of a wire.

BACKGROUND ART

Conventionally, a structure described in JP 61-163576A is known as a structure for holding an insulating covering of a wire in which an outer circumference of a core wire is covered by an insulating covering. At an end portion of the wire, the insulating covering is stripped off to expose the core wire. The end portion of the wire in a state in which the core wire is exposed is inserted in a connector.

The connector includes a housing in which a terminal is housed, and a cover housing that is attached to the housing. The terminal includes a spring-like contact portion, and the core wire inserted in the housing is electrically connected to the terminal by coming into elastic contact with the contact portion.

An insertion hole into which the wire is to be inserted is open at an end portion of the cover housing. A hinge is provided at the end portion of the cover housing in which the insertion hole is provided, and the end portion of the cover housing is elastically deformed using the hinge as a fulcrum, whereby the insulating covering of the wire inserted in the insertion hole is elastically held by the hole edge portion of the insertion hole.

Due to the above-described configuration, the wire is held by the hole edge portion of the insertion hole even if a force acting in a direction in which the wire is pulled off from the connector is applied to the wire. Accordingly, the electrical connection between the core wire and the terminal is maintained.

CITATION LIST

Patent Documents

Patent Document 1: JP 61-163576A

SUMMARY OF INVENTION

Technical Problem

However, according to the above-described technique, the cover housing is made of a synthetic resin, and therefore, there is a concern that the wire cannot be held when the force applied to the wire is relatively large. If the wire cannot be held, there is a concern that the wire will be pulled off from the cover housing, and, moreover, the core wire will also come off from the contact of the terminal, resulting in electrical disconnection between the core wire and the terminal.

The technique disclosed in the present specification has been completed based on the above-described circumstances, and an object thereof is to increase the wire holding ability.

Solution to Problem

A technique disclosed in the present specification is directed to a wire holding member for holding a wire in which an outer circumference of a core wire is covered by an insulating covering, the wire holding member including: a front wall that includes an insertion hole having an inner diameter larger than an outer diameter of the core wire so as to allow the core wire to be passed therethrough; a plurality of extending pieces that extend rearward from a plurality of different end edges of the front wall, and that are to be disposed around the insulating covering; and a plurality of holding portions that protrude from rear end portions of the extending pieces toward the insulating covering, and that clamp an outer surface of the insulating covering, wherein at least the plurality of extending pieces and the plurality of holding portions are made of a metal.

With the above-described configuration, at least the extending pieces and the holding portions are made of a metal, and therefore, the insulating covering can be firmly held by the plurality of extending pieces and the holding portions provided on the extending pieces.

The following aspects are preferable as aspects of the technique disclosed in the present specification.

It is preferable that the holding portions extend obliquely forward from the rear end portions of the extending pieces.

With the above-described configuration, the holding portions extend obliquely forward, and, therefore, the holding portions can further firmly hold the insulating covering when a force pulling the wire rearward is applied to the wire.

It is preferable that an inner surface of the front wall and inner surfaces of the extending pieces are smoothly coupled by a curved surface.

With the above-described configuration, when passing the core wire through the insertion hole, a distal end of the core wire abuts against the inner surfaces of the extending pieces, whereby the distal end of the core wire is smoothly guided to the inner surface of the front wall, and is further guided to the insertion hole provided in the front wall. This can increase the efficiency of the operation of passing the core wire through the insertion hole.

Advantageous Effects of Invention

According to the technique disclosed in the present specification, it is possible to enhance the wire holding ability.

DESCRIPTION OF EMBODIMENTS

Embodiment 1

Embodiment 1 of the technique disclosed in the present specification will be described with reference to FIGS. 1 to 6. For use, a wire holding member 10 according to the present embodiment is attached to a connector housing 12 that houses a female terminal 11. The following description will be given, assuming that the Z direction is upward, the Y direction is forward, and the X direction is leftward.

Connector Housing 12

Figure 1:
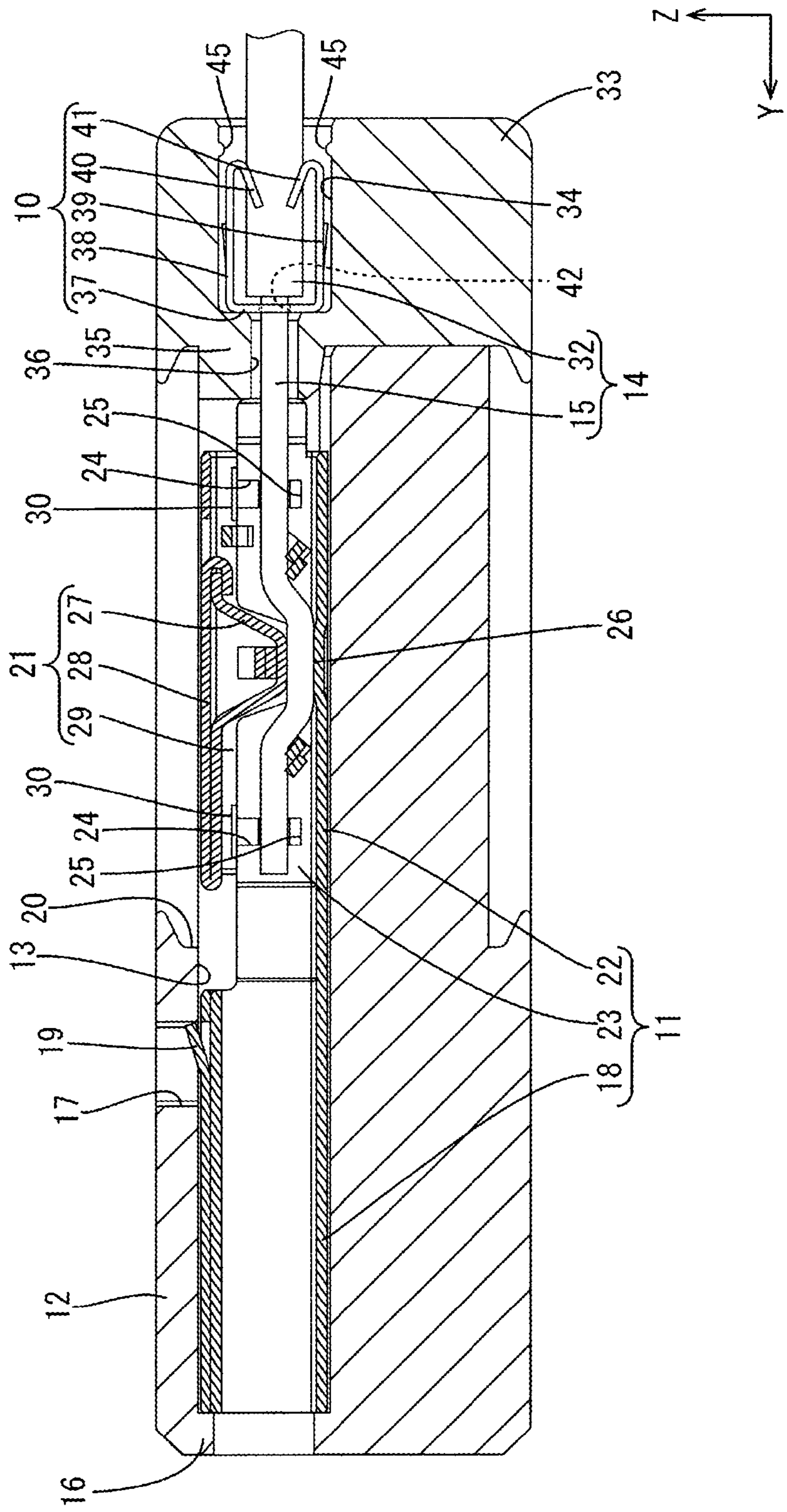
FIG. 1 is a cross-sectional view showing a state in which a rear holder that houses a wire holding member according to Embodiment 1 is attached to a connector housing.

As shown in FIG. 1, the connector housing 12, which is made of a synthetic resin, includes a cavity 13 that houses the female terminal 11. The cavity 13 is formed extending in the front-rear direction. The front side of the cavity 13 is open so as to allow a counterpart terminal (not shown) to be inserted thereinto. The rear side of the cavity 13 is also open so as to allow a core wire 15 of a wire 14, which will be described below, to be inserted thereinto.

A front end portion of the female terminal 11 abuts against a front wall 16 of the cavity 13 from behind, whereby the female terminal 11 is stopped at its front end. A lance locking hole 17 is formed in an upper wall of the cavity 13, and a metal lance 19 formed on a connection tube portion 18, which will be described below, of the female terminal 11 is locked to the lance locking hole 17, whereby the female terminal 11 is prevented from falling off rearward thereof.

An opening 20 that is open upward is formed in a rear half portion of the cavity 13 in the front-rear direction. From the opening 20, a pressing member 21 made of a metal can be inserted into the cavity 13 from above.

Female Terminal 11

The female terminal 11 is formed by pressing a metal plate material into a predetermined shape. The female terminal 11 includes a connection tube portion 18 into which the counterpart terminal is to be inserted, and a core wire connection portion 22 extending rearward from a bottom wall of the connection tube portion 18.

As the metal for forming the female terminal 11, any metal such as copper, a copper alloy, aluminum, and an aluminum alloy can be appropriately selected as needed. In the present embodiment, a copper or a copper alloy is used. A plated layer may be formed on the surface of the female terminal 11. As the metal for forming the plated layer, any metal such as tin and nickel can be appropriately selected as needed. In the present embodiment, tin is used.

Although not shown in detail, an elastic contact piece configured to be elastically connected to the counterpart terminal inserted in the connection tube portion 18 is disposed inside the connection tube portion 18. By the elastic contact piece and the male terminal coming into elastic contact, the counterpart terminal and the female terminal 11 are electrically connected.

An extending side wall 23 that extends rearward is provided at a rear end portion of a side wall of the connection tube portion 18. A lower end portion of the extending side wall 23 extends continuously with left and right side edges of the core wire connection portion 22. Accordingly, the core wire connection portion 22 and the extending side wall 23 form a U-shape that is open upward, as viewed in the front-rear direction.

Figure 2:
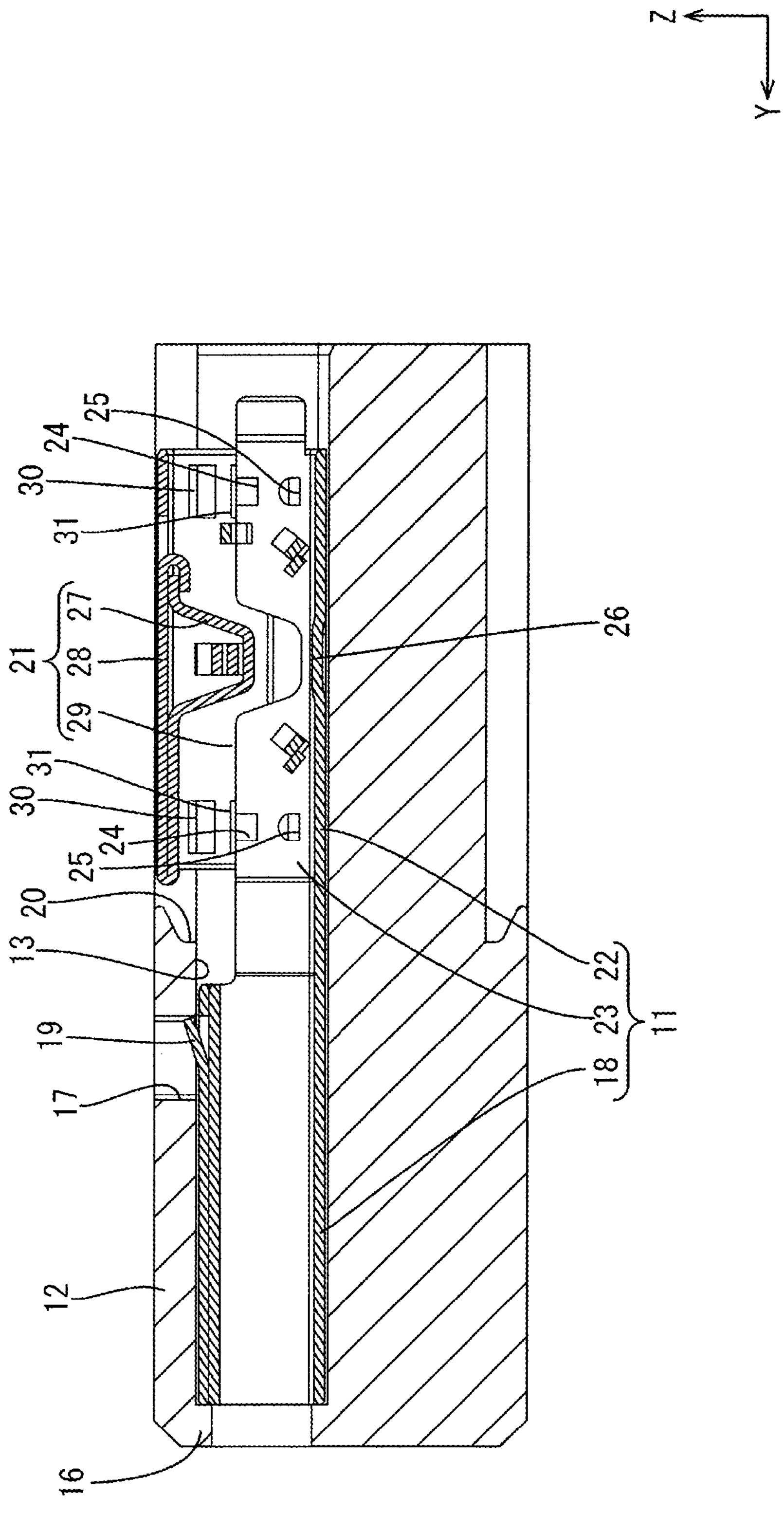
FIG. 2 is a cross-sectional view showing a state in which a female terminal is housed in the connector housing.

As shown in FIG. 2, at a position located toward a front end portion of the extending side wall 23 and a position located toward a rear end portion of the extending side wall 23, upper lock receiving portions 24 are provided at positions located toward an upper end portion of the extending side wall 23, and lower lock receiving portions 25 are provided at positions located toward a lower end portion of the extending side wall 23.

A connection protrusion 26 that protrudes upward is provided in the vicinity of the center of the core wire connection portion 22 in the front-rear direction. The connection protrusion 26 is formed by striking out the core wire connection portion 22 upward.

Pressing Member 21

As shown in FIG. 2, the pressing member 21 is configured to be mounted to a rear half portion of the female terminal 11 from above the core wire connection portion 22. The pressing member 21 is formed by pressing a metal plate material into a predetermined shape. As the metal for forming the pressing member 21, any metal such as copper, a copper alloy, aluminum, and an aluminum alloy can be appropriately selected as needed. In the present embodiment, copper or a copper alloy is used. A plated layer may be formed on the surface of the pressing member 21. As the metal for forming the plated layer, any metal such as tin and nickel can be appropriately selected as needed. In the present embodiment, tin is used.

On an upper wall 28 of the pressing member 21, a pressing portion 27 that hangs downward is formed in the vicinity of the center in the front-rear direction. The pressing portion 27 is formed in a substantially U-shape whose upper portion slightly widens as viewed from the side. A lower end portion of the pressing portion 27 is disposed at a position corresponding to a portion above the core wire connection portion 22.

As shown in FIG. 2, the pressing member 21 includes an upper wall 28 and a side wall 29 that hangs downward from the left and right side edges of the upper wall 28. At a position located toward a front end portion of the side wall 29 and a position located toward a rear end portion of the side wall 29, upper lock portions 30 are provided at positions located toward an upper end portion of the side wall 29, and lower lock portions 31 are provided at positions located toward a lower end portion of the side wall 29.

Figure 3:
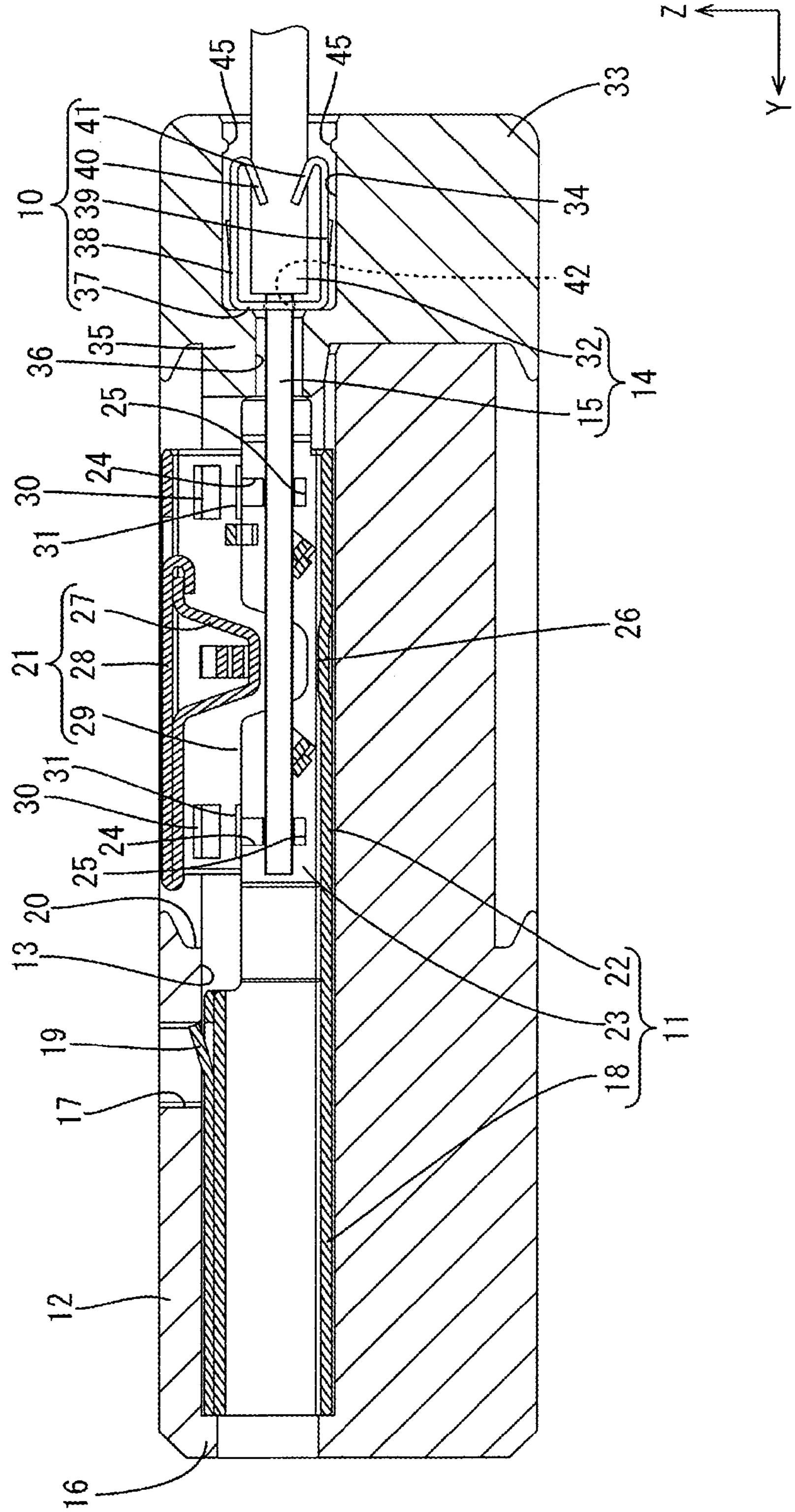
FIG. 3 is a cross-sectional view showing a state in which a core wire is passed through the female terminal in which a pressing member is held at a temporary locking position.

As shown in FIG. 3, in a state in which the lower lock portions 31 of the pressing member 21 are locked to the upper lock receiving portions 24 of the extending side wall 23, a predetermined gap is provided between the pressing portion 27 and the core wire connection portion 22, and the core wire 15 of the wire 14 can be passed through the space between the pressing portion 27 and the core wire connection portion 22. This state is referred to as a state in which the pressing member 21 is held at a temporary locking position to the female terminal 11.

In the wire 14, the outer circumference of the core wire 15 is surrounded by an insulating covering 32. The core wire 15 is a so-called single-core wire, which is made of a metal having a rod shape. As the metal for forming the core wire 15, any metal such as copper, a copper alloy, aluminum, and an aluminum alloy can be appropriately selected as needed. In the present embodiment, copper or a copper alloy is used.

As shown in FIG. 1, in a state in which the upper lock portions 30 of the pressing member 21 are locked to the upper lock receiving portions 24 of the extending side wall 23, and the lower lock portions 31 of the pressing member 21 are locked to the lower lock receiving portions 25 of the extending side wall 23, the core wire 15 of the wire 14 are clamped between the pressing portion 27 and the core wire connection portion 22. Thus, the core wire 15 and the female terminal 11 are electrically connected. This state is referred to as a state in which the pressing member 21 is held at a true locking position to the female terminal 11.

As described above, in the present embodiment, the core wire 15 and the female terminal 11 are connected by a method that is different from known crimping methods.

Rear Holder 33

As shown in FIG. 1, a rear holder 33 made of a synthetic resin is mounted to a rear end portion of the connector housing 12. The connector housing 12 and the rear holder 33 are mounted as a single piece by a known lock structure (not shown). The rear holder 33 includes a housing space 34 in which the wire holding member 10 is housed. A front wall 35 located forward of the housing space 34 has a core wire insertion hole 36 that is open forward so as to allow the core wire 15 to pass therethrough. A front wall 37, which will be described below, of the wire holding member 10 abuts against the front wall 35 from behind, whereby the wire holding member 10 is held in a state in which the wire holding member 10 is stopped at its front end. The inner diameter of the core wire insertion hole 36 is set to be larger than the outer diameter of the core wire 15.

A rear end portion of the housing space 34 is open rearward so as to allow the wire holding member 10 to be inserted thereinto. A projection 45 that protrudes inward is formed at a position located toward a rear end portion of the cavity 13. The wire holding member 10 housed in the cavity 13 abuts against the projection 45 from the front, whereby the wire holding member 10 is held in a state in which the wire holding member 10 is prevented from coming off rearward thereof.

Wire Holding Member 10

Figure 4:
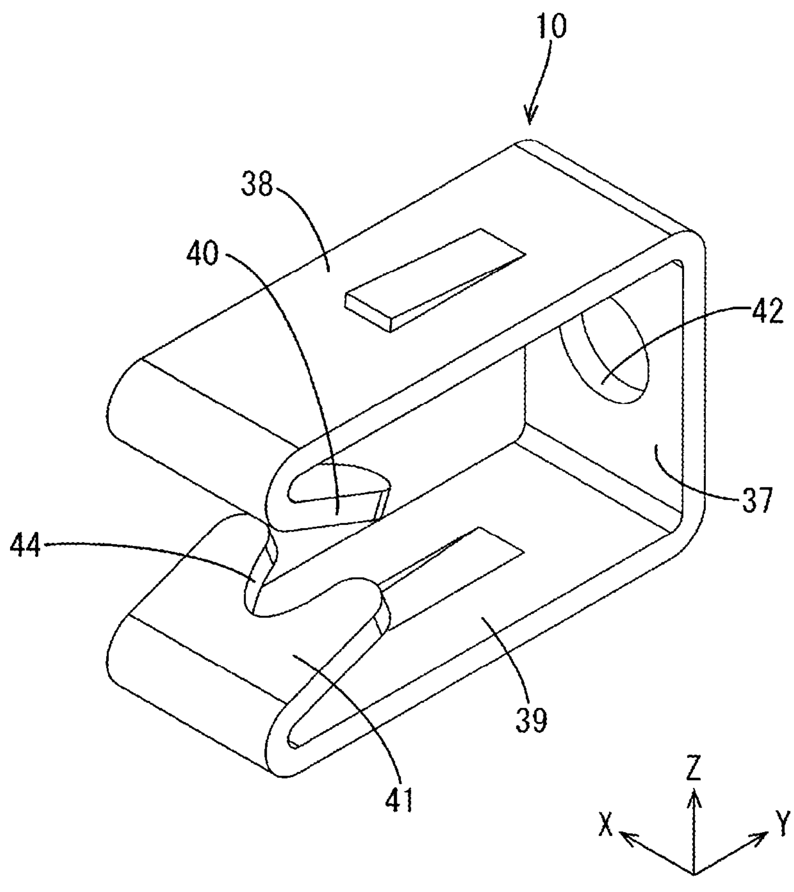
FIG. 4 is a perspective view showing the wire holding member.
Figure 5:
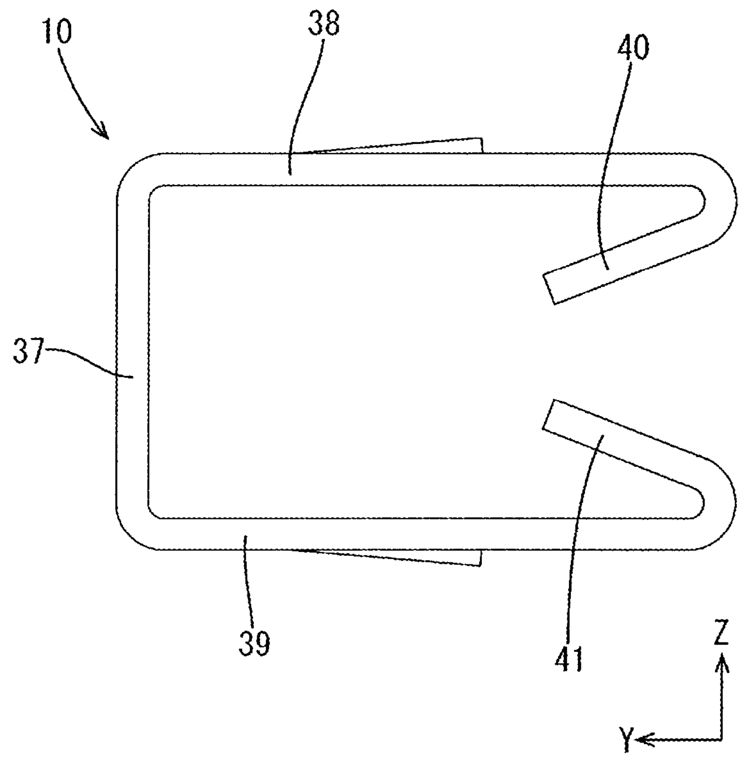
FIG. 5 is a side view showing the wire holding member.
Figure 6:
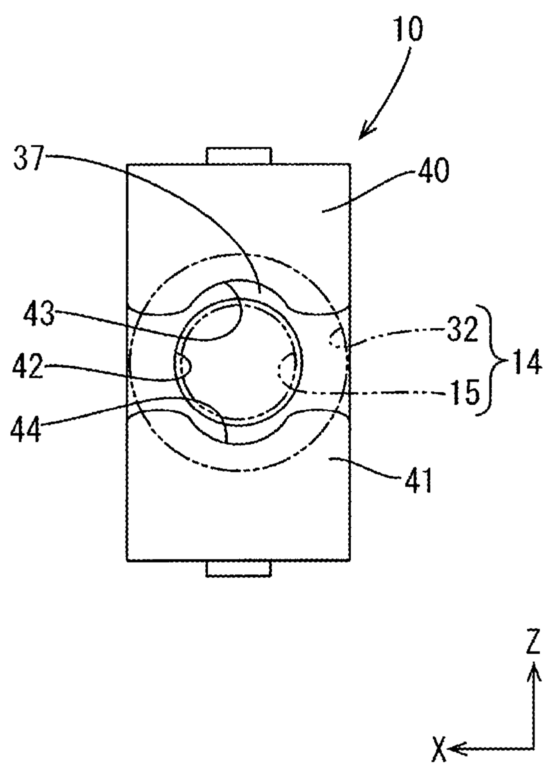
FIG. 6 is a rear view showing the wire holding member.

As shown in FIGS. 4 to 6, the wire holding member 10 is formed by pressing a metal plate material into a predetermined shape. As the metal for forming the pressing member 21, any metal such as copper, a copper alloy, aluminum, an aluminum alloy, and stainless steel can be appropriately selected as needed. In the present embodiment, copper or a copper alloy is used. A plated layer may be formed on the surface of the pressing member 21.

The wire holding member 10 includes a front wall 37 that is located on the front side relative to a direction in which the wire 14 is passed through in the wire holding member 10, an upper extending piece 38 (an example of an extending piece) and a lower extending piece 39 (an example of the extending piece) extending rearward from an upper end portion and a lower end portion, respectively, of the front wall 37, and an upper holding portion 40 (an example of a holding portion) protruding downward from a rear end portion of the upper extending piece 38 and a lower holding portion 41 (an example of the holding portion) protruding upward from a rear end portion of the lower extending piece 39.

The front wall 37 has a substantially rectangular shape as viewed from the front. An insertion hole 42 extending through the front wall 37 in the front-rear direction is formed in the vicinity of the center of the front wall 37 in the vertical direction. A hole edge portion of the insertion hole 42 has a circular shape. The inner diameter of the insertion hole 42 is set to be larger than the outer diameter of the core wire 15 so as to allow the core wire 15 to be inserted into the insertion hole 42.

The upper extending piece 38 and the lower extending piece 39 each have a plate shape that is flat in the vertical direction. The upper extending piece 38 can be elastically deformed in the vertical direction, using an upper end edge of the front wall 37 as a fulcrum. Also, the lower extending piece 39 can be elastically deformed in the vertical direction, using a lower end edge of the front wall 37 as a fulcrum.

A lower end edge 43 of the upper holding portion 40 is formed in the shape of a curve that is the widest on the lower end side and is narrowed toward the upper side. The lower end edge 43 of the upper holding portion 40 may have the shape of an arc that forms a part of a circle, or may have the shape of a curve that forms a part of an ellipse.

Similarly, an upper end edge 44 of the lower holding portion 41 is formed in the shape of a curve that is the widest on the upper end side and is narrowed toward the lower side. The upper end edge 44 of the lower holding portion 41 may have the shape of an arc that forms a part of a circle, or may have the shape of a curve that forms a part of an ellipse.

The upper holding portion 40 protrudes forward and obliquely downward and from the rear end portion of the upper extending piece 38, and the lower holding portion 41 protrudes forward and obliquely upward from the rear end portion of the lower extending piece 39. The upper holding portion 40 can be elastically deformed in the vertical direction, using the rear end portion of the upper extending piece 38 as a fulcrum. Also, the lower holding portion 41 can be elastically deformed in the vertical direction, using the rear end portion of the lower extending piece 39 as a fulcrum.

The lower end edge 43 of the upper holding portion 40 and the upper end edge 44 of the lower extending piece 39 are opposed to each other. The gap between the lower end edge 43 of the upper holding portion 40 and the upper end edge 44 of the lower extending piece 39 is set so as to allow the wire 14 to be passed therethrough. At least a part of the lower end edge 43 of the upper holding portion 40 and at least a part of the upper end edge 44 of the lower extending piece 39 are configured to abut against an outer surface of the insulating covering 32 of the wire 14. Thus, the insulating covering 32 of the wire 14 is clamped by the upper holding portion 40 and the lower holding portion 41.

Example of Mounting Process of the Present Embodiment

Next, an example of a mounting process of the present embodiment will be described. Note that the mounting process of the present embodiment is not limited to the following description.

First, the female terminal 11 is inserted into the cavity 13 of the connector housing 12 from behind. The metal lance 19 provided on the connection tube portion 18 of the female terminal 11 abuts against the inner wall of the cavity 13, and is thus elastically deformed. When the female terminal 11 is further pushed forward, the metal lance 19 is deformed back into its original shape, and abuts against the hole edge portion of the lance locking hole 17 from the front. Thus, the female terminal 11 is prevented from coming off rearward thereof. Also, the connection tube portion 18 abuts against the front wall 16 of the cavity 13 from behind, whereby the female terminal 11 is prevented from coming off forward thereof. As a result, the female terminal 11 is held in the connector housing 12 in a state in which the female terminal 11 is prevented from coming off.

The pressing member 21 is mounted to the female terminal 11 from the opening 20 formed in the connector housing 12. The lower end portion of the side wall 29 of the pressing member 21 abuts against the upper end portion of the extending side wall 23 of the female terminal 11 from above, whereby the side wall 29 of the pressing member 21 is elastically deformed in a direction in which the side wall 29 expands. When the pressing member 21 is further pushed downward, the side wall 29 of the pressing member 21 is deformed back into its original shape, and the lower lock portions 31 of the pressing member 21 and the upper lock receiving portions 24 of the female terminal 11 are elastically locked. Thus, the pressing member 21 is held at a temporary locking position to the female terminal 11 (see FIG. 2).

The wire holding member 10 is inserted into the housing space 34 of the rear holder 33 from behind in an orientation in which the front wall 37 is directed forward. The upper extending piece 38 and the lower extending piece 39 of the wire holding member 10 abut against, from above, the projection 45 that protrudes into the housing space 34, whereby the wire holding member 10 is prevented from coming off rearward thereof. Also, the front wall 37 of the wire holding member 10 abuts against, from behind, the front wall 35 that forms the housing space 34, whereby the wire holding member 10 is prevented from coming off forward thereof. Thus, the wire holding member 10 is held in the rear holder 33 in a state in which the wire holding member 10 is prevented from coming off.

The rear holder 33 is attached to the rear end portion of the connector housing 12.

At an end portion of the wire 14, a predetermined length of the core wire 15 is exposed by stripping off the insulating covering 32.

The wire 14 is inserted into the housing space 34 of the rear holder 33 from behind in an orientation in which the core wire 15 is directed forward. The core wire 15 is inserted into the housing space 34 of the rear holder 33, and is then inserted into the insertion hole 42 of the front wall 37 through the space between the upper holding portion 40 and the lower holding portion 41.

When the wire 14 is further pushed forward, the core wire 15 is inserted into the connector housing 12 from the rear holder 33, and is then moved forward inside the female terminal 11 through the space between the pressing portion 27 of the pressing member 21 and the connection protrusion 26 of the female terminal 11. The front end portion of the core wire 15 is pushed to a position that is located forward of at least the pressing portion 27.

Meanwhile, inside the rear holder 33, the insulating covering 32 of the wire 14 is pushed from behind into the space between the lower end edge 43 of the upper holding portion 40 and the upper end edge 44 of the lower holding portion 41 of the wire holding member 10. The wire 14 is smoothly moved forward by being guided by the curved surface formed on the lower end edge 43 of the upper holding portion 40 and the curved surface formed on the upper end edge 44 of the lower holding portion 41.

When the wire 14 is further pushed forward, the upper holding portion 40 and the upper extending piece 38 are elastically deformed upward, thus exerting a downward elastic force on the insulating covering 32. Also, the lower holding portion 41 and the lower extending piece 39 are elastically deformed downward, thus exerting an upward elastic force on the insulating covering 32. As a result, the insulating covering 32 is clamped by the upper holding portion 40 and the lower holding portion 41 (see FIG. 3).

The pressing member 21 is moved to the true locking position relative to the female terminal 11 by pressing the pressing member 21 downward. Specifically, the upper lock portions 30 of the pressing member 21 and the upper lock receiving portions 24 of the female terminal 11 are elastically locked, and the lower lock portions 31 of the pressing member 21 and the lower lock receiving portions 25 of the female terminal 11 are elastically locked. In this state, the core wire 15 is clamped between the pressing member 21 and the connection protrusion 26. Thus, the core wire 15 and the female terminal 11 are electrically connected (see FIG. 1).

Operations and Effects of the Present Embodiment

Next, operations and effects of the present embodiment will be described. A wire holding member 10 according to the present embodiment is a wire holding member 10 for holding a wire 14 in which an outer circumference of a core wire 15 is covered by an insulating covering 32, the wire holding member 10 including: a front wall 37 that includes an insertion hole 42 having an inner diameter larger than an outer diameter of the core wire 15 so as to allow the core wire 15 to be passed therethrough; an upper extending piece 38 and a lower extending piece 39 that extend rearward from a plurality of different end edges of the front wall 37, and that are to be disposed around the insulating covering 32; and an upper holding portion 40 and a lower holding portion 41 that protrude from rear end portions of the upper extending piece 38 and the lower extending piece 39 toward the insulating covering 32, and that clamp an outer surface of the insulating covering 32, wherein at least the upper and lower extending pieces 38 and 39 and the upper and lower holding portions 40 and 41 are made of a metal.

With the above-described configuration, at least the upper and lower extending pieces 38 and 39 and the upper and lower holding portions 40 and 41 are made of a metal, and, therefore, the insulating covering 32 can be firmly held by the upper and lower extending pieces 38 and 39, and the upper and lower holding portions 40 and 41 provided on the upper and lower extending pieces 38 and 39.

In the present embodiment, the upper and lower holding portions 40 and 41 extend obliquely forward from the rear end portions of the upper and lower extending pieces 38 and 39. With the above-described configuration, the upper and lower holding portions 40 and 41 extend obliquely forward, and, therefore, the upper and lower holding portions 40 and 41 can further firmly hold the insulating covering 32 when a force pulling the wire 14 rearward is applied to the wire 14.

Embodiment 2

Figure 7:
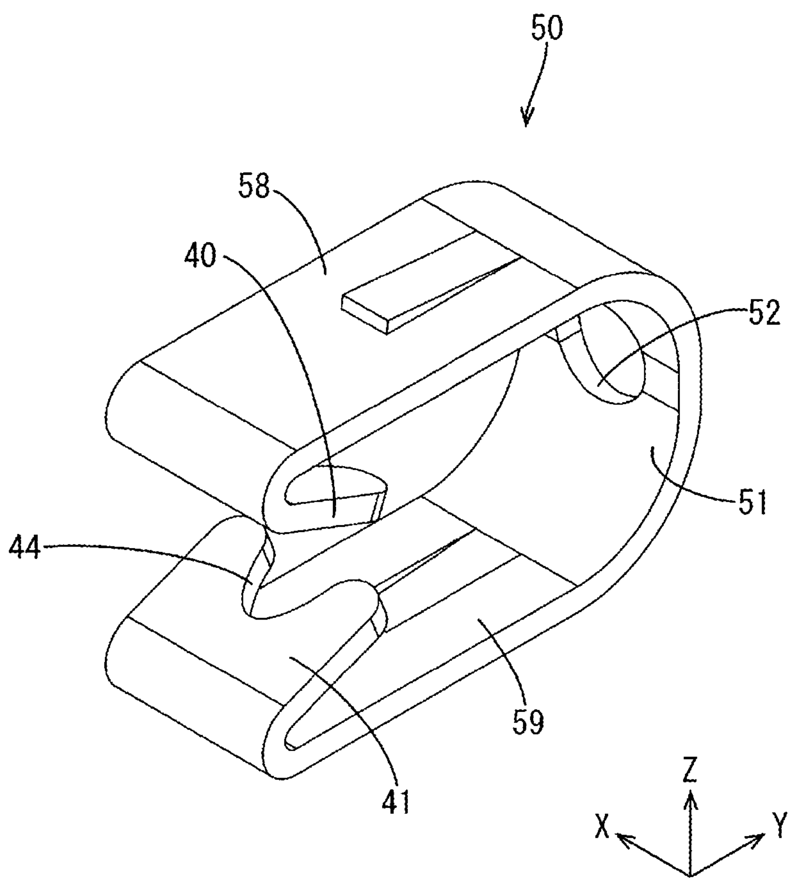
FIG. 7 is a perspective view showing a wire holding member according to Embodiment 2.

Next, Embodiment 2 of the technique disclosed in the present specification will be described with reference to FIGS. 7 to 9. In a wire holding member 50 according to the present embodiment, an upper end portion of a front wall 51 and an upper extending piece 58 extend continuously so as to form a smooth curved surface as viewed from the side. Thus, an inner surface of the front wall 51 and an inner surface of the upper extending piece 58 are smoothly coupled by the curved surface. In other words, no clear step is formed on a boundary portion between the upper extending piece 58 and the front wall 51.

Figure 8:
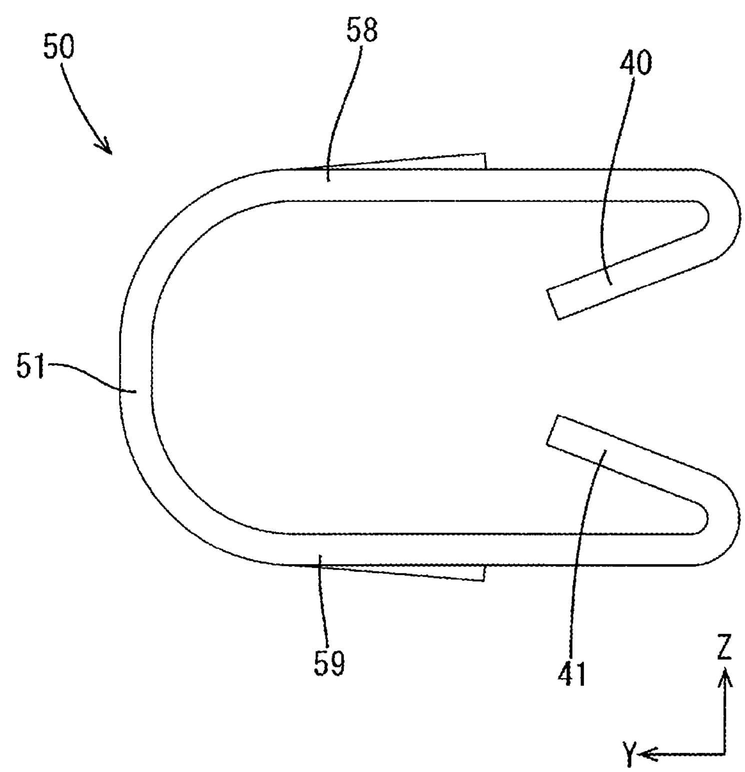
FIG. 8 is a side view showing the wire holding member.

As shown in FIG. 8, a lower end portion of the front wall 51 and a lower extending piece 59 extend continuously so as to form a smooth curved surface as viewed from the side. Thus, an inner surface of the front wall 51 and an inner surface of the lower extending piece 59 are smoothly coupled by the curved surface. In other words, no clear step is formed on a boundary portion between the lower extending piece 59 and the front wall 51.

Figure 9:
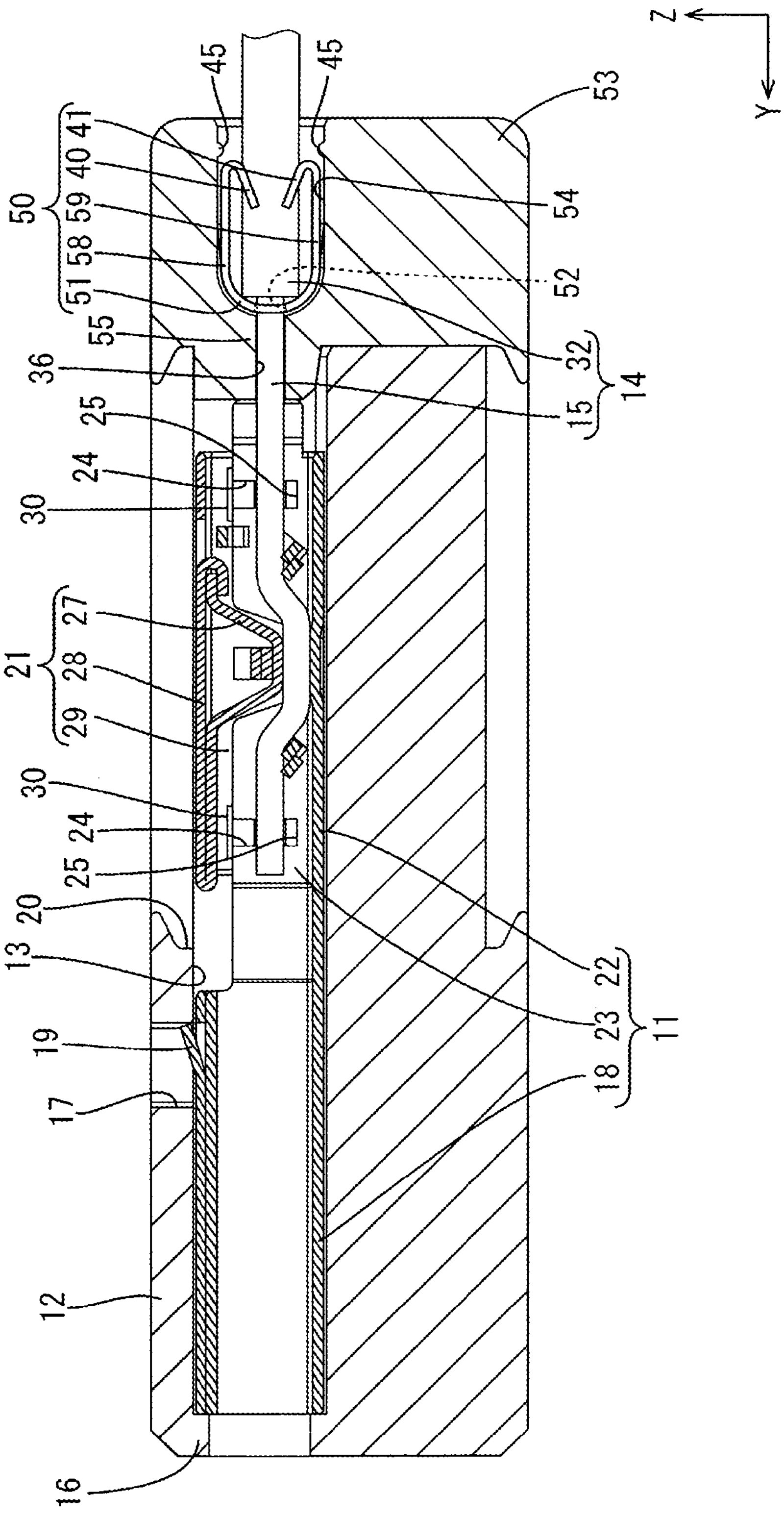
FIG. 9 is a cross-sectional view showing a state in which a rear holder that houses the wire holding member according to Embodiment 2 is attached to a connector housing.

As shown in FIG. 9, a front wall 55 of a housing space 54 of a rear holder 53 is formed in a shape resembling a front surface of the front wall 51 of the wire holding member 50. Thus, the wire holding member 50 is held in the rear holder 53 in a state in which the wire holding member 50 is stopped at its front end.

The rest of the configuration is substantially the same as that of Embodiment 1, and, therefore, the same members are denoted by the same reference numerals, and redundant descriptions thereof have been omitted.

According to the present embodiment, the inner surface of the front wall 51 of the wire holding member 50 is smoothly coupled to the inner surface of the upper extending piece 58 and the inner surface of the lower extending piece 59 by a curved surface. Accordingly, when passing the core wire 15 through the insertion hole 52, a distal end of the core wire 15 abuts against the inner surface of the upper extending piece 58 or the inner surface of the lower extending piece 59, whereby the distal end of the core wire 15 is smoothly guided to the inner surface of the front wall 51, and is further guided to the insertion hole 52 provided in the front wall 51. This can increase the efficiency of the operation of passing the core wire 15 through the insertion hole 52.

Other Embodiments

The technique disclosed in the present specification is not limited to the embodiments described and illustrated above. For example, the following embodiments also fall within the technical scope of the technique disclosed in the present specification.

(1) The wire holding member may be configured such that its front wall is made of a synthetic resin, and an extending piece made of a metal is fixed to an end portion of the front wall.

(2) In Embodiments 1 and 2, two extending pieces are formed on one wire holding member. However, the present invention is not limited thereto, and it is possible to adopt a configuration in which three or more extending pieces are provided on one wire holding member.

(3) In Embodiments 1 and 2, each holding portion is configured to protrude obliquely forward. However, the present invention is not limited thereto, and it is possible to adopt a configuration in which each holding portion protrudes from the corresponding extending piece so as to be bent at a right angle toward the insulating covering.

(4) Although each of the core wires 15 according to Embodiments 1 and 2 is a single-core wire, the present invention is not limited thereto. The core wire 15 may be a stranded wire formed by twisting together a plurality of thin metal wires.

(5) The female terminal 11 and the core wire 15 can be connected by any method, and may be connected through pressure contact, may be connected through soldering or brazing, or may be connected through welding such as ultrasonic welding or laser welding.

(6) Although the female terminal 11 is used as the terminal in Embodiments 1 and 2, the terminal may be a male terminal.

LIST OF REFERENCE NUMERALS

10, 50 Wire holding member
14 Wire
15 Core wire
32 Insulating covering
37, 51 Front wall
38, 58 Upper extending piece
39, 59 Lower extending piece
40 Upper holding portion
41 Lower holding portion
42, 52 Insertion hole

The invention claimed is:

1. A wire holding member for holding a wire in which an outer circumference of a core wire is covered by an insulating covering, the wire holding member comprising:

a front wall that includes an insertion hole having an inner diameter larger than an outer diameter of the core wire so as to allow the core wire to be passed therethrough;

a plurality of extending pieces that extend rearward from a plurality of different end edges of the front wall, and that are configured to be disposed around the insulating covering, wherein the plurality of extending pieces extend parallel to each other; and a plurality of holding portions that protrude from rear end portions of the extending pieces toward the insulating covering, and that clamp an outer surface of the insulating covering, wherein the holding portions extend obliquely forward from the rear end portions of the extending pieces and are symmetrical to each other with respect to a central axis of the holding member, and wherein at least the plurality of extending pieces and the plurality of holding portions are made of a metal.

2. The wire holding member according to claim 1, wherein an inner surface of the front wall and inner surfaces of the extending pieces are smoothly coupled by a curved surface.

* * * * *